US010891248B2

(12) United States Patent
Li et al.

(10) Patent No.: US 10,891,248 B2
(45) Date of Patent: Jan. 12, 2021

(54) CONFIGURING WIRELESS COMMUNICATIONS ACCORDING TO MULTIPLE COMMUNICATION PROTOCOLS

(71) Applicant: NXP B.V., Eindhoven (NL)

(72) Inventors: Hong Li, Veldhoven (NL); Fabian Rivière, Cagny (FR); Christopher John Gray, Rotherham (GB)

(73) Assignee: NXP B.V., Eindhoven (NL)

( * ) Notice: Subject to any disclaimer, the term of this patent is extended or adjusted under 35 U.S.C. 154(b) by 224 days.

(21) Appl. No.: 15/594,885

(22) Filed: May 15, 2017

(65) Prior Publication Data
US 2017/0351630 A1 Dec. 7, 2017

(30) Foreign Application Priority Data

Jun. 7, 2016 (EP) .................................... 16305666

(51) Int. Cl.
*G06F 13/40* (2006.01)
*H04W 72/12* (2009.01)
(Continued)

(52) U.S. Cl.
CPC ......... *G06F 13/4027* (2013.01); *H04B 1/713* (2013.01); *H04L 43/0811* (2013.01);
(Continued)

(58) Field of Classification Search
CPC .. G06F 13/4027; H04L 63/12; H04L 43/0811; H04L 45/02; H04B 1/713; H04W 72/1215; H04W 74/04; H04W 88/06
See application file for complete search history.

(56) References Cited

U.S. PATENT DOCUMENTS 6,895,255 B1 5/2005 Bridgelall
6,990,082 B1 1/2006 Zehavi et al.
(Continued)

FOREIGN PATENT DOCUMENTS

WO 2009/013238 A1 1/2009

OTHER PUBLICATIONS

Marinoni, M., et al., "Dual-Protocol Support for Bluetooth LE Devices", 2015 IEEE 13th International Conference on Industrial Informatics, pp. 919-922 (2015).

(Continued)

*Primary Examiner* — Walter J Divito
*Assistant Examiner* — Anthony Luo

(57) ABSTRACT

A method for communicating between a combo-endpoint device, wireless router and a wireless communication device includes monitoring communication patterns of wireless data communications between a wireless router and radio-communication circuitry of a combo-endpoint device, and storing data indicative of communication times of the wireless router based on the monitored communication patterns. The method further includes configuring a frequency-hopping(FH)-based protocol by defining connection periods according to time windows and selected frequencies for wireless communication of data between the wireless communication device and the radio-communication circuitry, and by establishing the time windows to not substantially conflict with the communication times of the wireless router.

17 Claims, 5 Drawing Sheets

(51) Int. Cl.
*H04B 1/713* (2011.01)
*H04L 12/26* (2006.01)
*H04L 12/751* (2013.01)
*H04L 29/06* (2006.01)
*H04W 74/04* (2009.01)
*H04W 88/06* (2009.01)

(52) U.S. Cl.
CPC .............. *H04L 45/02* (2013.01); *H04L 63/12* (2013.01); *H04W 72/1215* (2013.01); *H04W 74/04* (2013.01); *H04W 88/06* (2013.01); *Y02D 10/00* (2018.01)

(56) References Cited

U.S. PATENT DOCUMENTS

| | | | |
|---|---|---|---|
| 8,203,991 B2 | 6/2012 | Thoukydides | |
| 8,406,248 B2* | 3/2013 | Pratt, Jr. | G01D 21/00 370/444 |
| 2002/0155842 A1* | 10/2002 | Yoshizawa | H04W 16/10 455/452.1 |
| 2004/0246929 A1 | 12/2004 | Beasley et al. | |
| 2006/0193375 A1 | 8/2006 | Lee | |
| 2007/0103324 A1* | 5/2007 | Kosuge | E03F 7/00 340/618 |
| 2010/0322287 A1 | 12/2010 | Truong et al. | |
| 2012/0252375 A1 | 10/2012 | Walley et al. | |
| 2013/0040573 A1 | 2/2013 | Hillyard | |
| 2013/0107804 A1 | 5/2013 | Akisada et al. | |
| 2013/0155931 A1 | 6/2013 | Prajapati et al. | |
| 2014/0065985 A1* | 3/2014 | Weissman | H04B 1/40 455/86 |
| 2015/0200738 A1 | 7/2015 | Weterwald et al. | |
| 2017/0118089 A1 | 4/2017 | Hur et al. | |
| 2017/0188181 A1 | 6/2017 | Jin et al. | |
| 2017/0353365 A1 | 12/2017 | Li et al. | |

OTHER PUBLICATIONS

Hawelikar, Mayur et al; "A design of Linux based ZigBee and Bluetooth Low Energy Wireless Gateway for Remote Parameter Monitoring", IEEE 2015 International conference on Circuit, Power and Computing Technologies; 4 pages (2015).

Bluetooth; "Master Table of Contents & Compliance Requirements"; Version 4.2 [vol. 0, Part A] 1500 pages (uploaded in multiple parts); Dec. 2, 2014.

Non Final Office Action; U.S. Appl. No. 15/595,535; 15 pages (dated Mar. 7, 2019).

Final Office Action; U.S. Appl. No. 15/595,535; 23 pages (dated Jul. 11, 2019).

Non Final Office Action; U.S. Appl. No. 15/595,535; 20 pages (dated Mar. 12, 2020).

* cited by examiner

CONFIGURING WIRELESS COMMUNICATIONS ACCORDING TO MULTIPLE COMMUNICATION PROTOCOLS

CROSS-REFERENCE TO RELATED APPLICATIONS

This application claims the priority under 35 U.S.C. § 119 of European patent application no. 16305666.6, filed Jun. 7, 2016 the contents of which are incorporated by reference herein.

OVERVIEW

Aspects of various embodiments are directed to configuring wireless communications of a combo-endpoint device according to multiple communication protocols.

Various devices communicate according to a particular communication protocol. Some example protocols include Bluetooth and ZigBee. Both Bluetooth Low Energy (BLE) and IEEE 802.15.4 Wireless Personal Area Network (WPAN) devices provide key low power communication and are popular in the Internet of Things (IoT) new products, for applications, including wireless sensor network (WSN) applications, home automation, smart office or building, wearable devices and health care. Many of these applications, such as temperature sensors, are powered by a battery and, thereby, have low energy consumption, low event rate and low communication throughput.

Several technologies such as ZigBee (ZB), 6lowPAN and Thread are built upon the IEEE 802.15.4, and have the technical advantage to form and manage ultra-low power devices in low power networks, while BLE is widely used in mobile phones, convenient and preferable as the personal interface, but less advanced to form large low power networks effectively These and other matters have presented challenges to efficiencies of communicating according to multiple communication protocol implementations, for a variety of applications.

SUMMARY

Various example embodiments are directed to issues such as those addressed above and/or others which may become apparent from the following disclosure concern configuration of wireless communications of a combo-endpoint device according to multiple communication protocols and such that the communications according to the respective communication protocols are non-conflicting.

In certain example embodiments, aspects of the present disclosure involve monitoring communication patterns of wireless data communications between a wireless router and a combo-endpoint device and configuring a frequency-hopping-based protocol for wireless communications between a wireless communication device and the combo-endpoint device that does not conflict with the monitored communication pattern.

In a more specific example embodiment, a method embodiment is used for communicating between a combo-endpoint device and each of a wireless router and a wireless communication device. The combo-endpoint device communicates with both the wireless router and the wireless device, but not at the same time. In specific embodiments, the wireless router is a ZigBee router and the wireless communication device is a BLE communication device. For example, the combo-endpoint device is a chip configured to communicate to both a ZigBee network and BLE links but not both simultaneously. To prevent conflicts between the communications with the different networks, communication patterns of wireless data communications between the wireless router and radio-communication circuitry of the combo-endpoint device is monitored. In some aspects, the communication patterns of wireless data communications between the wireless router and other wireless devices are additionally monitored. Based on the monitored communication patterns, data indicative of the communication times of the wireless router with the combo-endpoint device is stored. A frequency-hopping based protocol is configured by defining connection periods according to time windows and selected frequencies for wireless communication of data between the wireless communication device and the radio-communication circuitry and by establishing the time windows to not substantially conflict with the communication times of the wireless router.

In another specific example embodiment, an apparatus embodiment, such as a combo-endpoint device, includes radio-communication circuitry and data-communication scheduling circuitry. The radio-communication circuitry communicates wirelessly with both a wireless router and a wireless communication device at different given times. For example, the radio-communication circuitry communicates with the wireless router according to a spread spectrum (SS)-based protocol defined by the wireless router, and communicates wirelessly with the wireless communication device via a frequency hopping (FH)-based protocol. The FH-based protocol, such as used by BLE protocol, defines connection periods according to time windows and selected frequencies for communication of data between the wireless communication device and the radio-communication circuitry. The data-communication scheduling circuitry, in various embodiments, establishes coordinated communication patterns between the combo-endpoint device and each of the wireless router and the wireless communication device. For example, the data-communication scheduling circuitry monitors communication patterns of wireless data communications between the wireless router and the radio-communication circuitry to store data indicative of communication times of the wireless router, and configures the FH-based protocol for communication between the wireless communication device and the radio-communication circuitry by providing time windows for the FH-based protocol which do not substantially conflict with the communication times of the wireless router.

In other specific example embodiments, the radio-communication circuitry communicates with a ZigBee router and a wireless communication device, such as a BLE device. For example, the radio-communication circuitry communicates wirelessly with a ZigBee router according to a direct-sequence spread spectrum (DSS)-based network protocol defined by the ZigBee router, and wirelessly with a wireless communication device via a frequency-hopping spread spectrum (FHSS)-based protocol. The FHSS-based protocol defines connection periods, in time windows, for communication of data between the wireless communication device and the radio-communication circuitry. The data-communication scheduling circuitry monitors communication patterns of wireless data communications between the ZigBee router and the radio-communication circuitry to store data indicative of communication times of the ZigBee router and establishes coordinated wireless communication schedules for the radio-communication circuitry to communicate with both the wireless communication device and the ZigBee router. For example, establishing the coordinated wireless communication schedules includes configuring the FHSS-based protocol for communication between the wireless communication device and the combo-endpoint device with selected time windows for FHSS-based data communications and providing the selected time windows at intervals that do not substantially conflict with the communication times of the ZigBee router.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
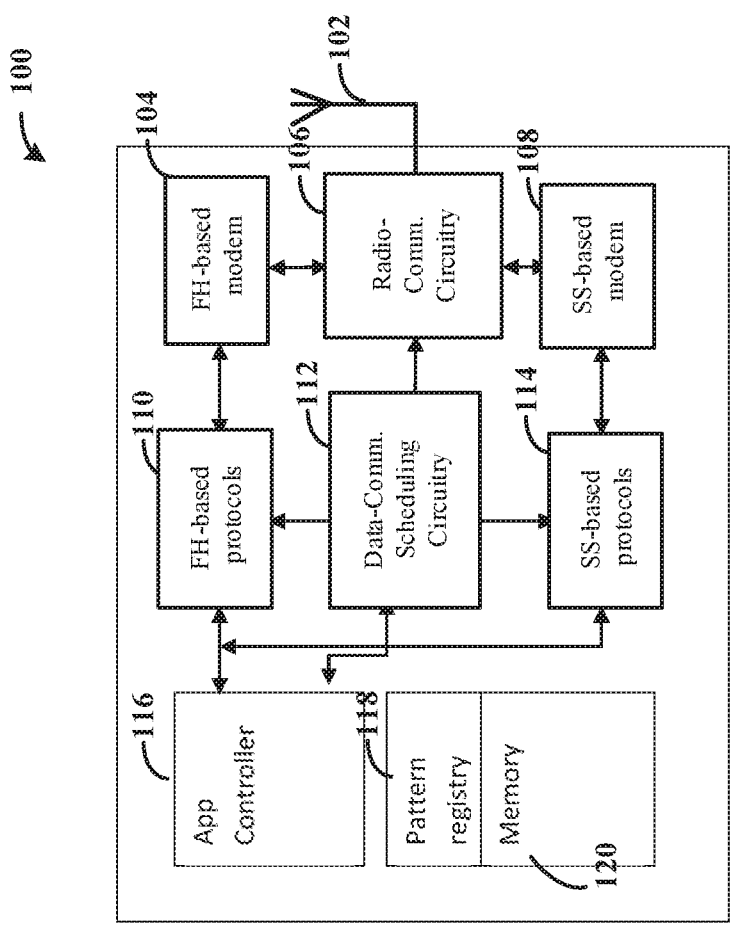
FIG. 1 illustrates an example apparatus, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving configuring a frequency-hopping based protocol for communication of data that does not substantially conflict with monitored communication times of a wireless router. In certain implementations, aspects of the present disclosure have been shown to be beneficial when used in the context of a combo-endpoint device, such as an integrated chip, that is configured to communicate according to either a frequency-hopping based protocol or a direct or parallel-sequence spread spectrum based protocol at a given time. In some embodiments, the combo-endpoint device includes data-communication scheduling circuitry to monitor and store communications patterns of a ZigBee (ZB) router. Using the monitored communication patterns, the combo-endpoint device schedules connection periods for wireless communication data between the combo-endpoint device and a Bluetooth Light Energy (BLE) communication device that does not conflict with the communication patterns of the ZB router. While not necessarily so limited, various aspects may be appreciated through the following discussion of non-limiting examples which use exemplary contexts. Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Various embodiments in accordance with the present disclosure include and/or relate to a combo-endpoint device that is capable of communicating wirelessly with either a wireless router or a wireless communication device at a given time. The wireless router and wireless communication device communicate according to two different communication protocols. The two different communication protocols can include a frequency-hopping (FH)-based protocol and a spread spectrum (SS)-based protocol. As a specific example, the wireless router is a ZB router and the wireless communication device is a BLE communication device, sometimes referred to as a "BLE link." ZB is standardized using IEEE 802.15. Further, ZB operates at 868 MHz, 915 MHz and 2.14 MHz frequencies and consume bandwidths up to 0.3 MHz, 0.6 MHz, and 2 MHz, depending upon the specific network. BLE operates at 2.4 GHz frequency and consumes bandwidths, e.g., 1 MHz and/or 2 MHz. The combo-endpoint device can communicates across two different networks. The different networks operate according to different communication protocols. The combo-endpoint device is capable of data communication over the two different networks and includes one antenna and radio-communication circuitry. For example, the combo-endpoint device is a single combo-integrated chip that includes radio-communication circuitry and a single antenna configured to communicate across both networks. In a specific embodiment, a ZB-BLE combination chip provides communication to a ZB network via communication with a ZB router and to multiple BLE communication devices, i.e., BLE links. In other embodiments, the combo-endpoint device includes one antenna that two different (or shared) radio-communication circuitry share. For example, two separate integrated chips share a single antenna that is connected to a respective integrated chip responsive to a communication time window. Alternatively, each radio-communication circuitry is provided with its own antenna, but the device communicates according to one protocol at a time (e.g., are separately activated).

A combo-endpoint device is used to communicate with both networks while reducing power consumption as much as possible. For example, the combo-endpoint device often runs at a very low duty cycle to reduce its active time, especially at the radio-active time. The combo-endpoint device communicates with one of the networks at a given time due to interference between the signals in the two networks (e.g., based on the different protocols) and/or within the communication circuitry of the endpoint-device, due to shared circuitry and/or resources by the communication circuitry and/or other reasons. Interference can be particularly problematic if one or both protocols use data communications that are temporally aligned to begin at a given instant. For example, Bluetooth/BLE operates on a time window allocation scheme. Bluetooth networks operate using a time-division multiplexing scheme to arrange transmissions between a master and its slaves. Data is transmitted in the time windows, with the master typically transmitting data during odd-number time windows. The start and end of the time windows are determined by the master device, and each slave device is synchronized with the same. A combo-endpoint device configured to communicate over a Bluetooth network and a ZG network may miss a time window for transmitting over the Bluetooth network in order to transmit data over the ZB network.

The two protocols can include two different protocols that are or at one point were standardized on the IEEE 802.15. For example, the SS-based protocol in various embodiments is based on IEEE 802.15.4. Several technologies such as ZigBee (ZB), 6lowPAN and Thread are built upon the IEEE 802.15.4, which have technical advantage to form and manage ultra-low power devices in low power networks. The FH-based protocol can be a FH spread spectrum (FHSS)-based protocol, such as BLE. In a ZB network or other WiFi network, more than 65,000 nodes can be connected together and can exist for a range of up to 10-100 meters. A BLE network can have a number of nodes connected together and can exist for a range of up to 10 meters.

As a specific example, a BLE communication device is sending a message to the combo-endpoint device according to an agreed schedule, but the combo-endpoint device is still sending/receiving a message to/from the ZB router. These conflicts may lead to extra energy consumption of the combo-endpoint device due to extra traffic activity composed of packet retries sequences, and have an impact to both the ZB network and the BLE device in terms of extra traffic activity and latency. Embodiments in accordance with the present disclosure include monitoring communication patterns between the combo-endpoint device and a ZB router to schedule and reschedule BLE connection periods according to time windows and selected frequencies. The BLE connection periods are used to wirelessly communicate data between the BLE communication device and the combo-endpoint device that mitigates conflict of communication of the combo-endpoint device with the BLE network and the ZB network. For example, the combo-endpoint device establishes time windows for the BLE protocol that do not conflict (e.g., avoid, do not at a point in time, or substantially do not conflict) with communication times of the ZB router.

Various embodiments include methods and devices involving a combo-endpoint device. The combo-endpoint device includes one or more integrated chips configured to communicate with devices according to two different communication protocols. For example, the combo-endpoint device schedules and reschedules BLE time windows and window offsets, using known regular communication patterns (e.g., ZB communication schedules between the combo-endpoint device and the ZB router) to avoid conflicts between the BLE and ZB links and the combo-endpoint device. In various embodiments, the combo-endpoint device monitors communication patterns of wireless data communication between a wireless router and radio-communication circuitry of the combo-endpoint device. Data indicative of communication times of the wireless router is stored based on the monitored communication patterns. Further, a FH-based protocol (e.g., BLE communication protocol) is configured by defining connection periods according to time windows and selected frequencies for wireless communication of data between the wireless communication device and the radio-communication circuitry and by establishing the time windows to not conflict with the communication times of the wireless router. In various embodiments, the time windows for the FH-based protocol are a multiple of the time windows for the wireless router communication times and wireless router communicates according to the SS-based protocol. Thereby, the FH-based protocol is configured to occur at time windows that are a multiple of the time window of the SS-based protocol. In other embodiments, the FH-based protocol uses a time window that is not a multiple of time window of the SS-based protocol. In such embodiments, a pattern between the two communications is identified and used to identify time windows and window offsets. In either embodiment, the FH-based protocol is configured by determining the time windows and window offsets between the time windows (e.g., between a time window of the SS-based protocol and time window of the FH-based protocol) that mitigates or does not conflict with the communication times (e.g., time windows) of the wireless router.

As previously discussed, in some specific embodiments, the wireless router is a ZB router and the wireless communication device is a BLE device. In typical wireless-sensor network (WSN) and Internet of Things (IoT) applications, an associated sensor in a ZB network usually wakes up periodically (e.g. once every several seconds or minutes), and then sends a message to report the sensed information (e.g. the temperature at the moment) via its ZB router to the network, so that the network knows the measured information. The sensor may retry sending the message for a few times, if it did not receive an acknowledgement from the ZB router to confirm that the message has been received successfully. After the reporting, which may take a few milliseconds, it falls into sleep to save energy until the next wakeup moment. For a new sensor or a sensor that has lost its association to the ZB network, the sensor starts an association procedure to find the ZB router to join the network via a set of message communications, before the sensor can start the regular reporting-sleep-reporting cycle behavior. Usually the ZB routers are statically mounted in a place with power-line energy supply. ZB sensors are often statically mounted and run in a stable network topology and regularly communicate with an associated router.

A BLE device pair, e.g., a master device and slave device, communicate in a similar way. The device pair set up a connection via BLE advertising procedures, and then communicate periodically following a connection period. If a BLE device has completed communication in a connection period, it may fall into a sleep mode for many seconds until the beginning of the next period. The BLE device pair can negotiate the connection period length and starting time (also called a connection window offset in this document) in the connection setup procedure. The BLE device pair may also reset the connection period and starting time by sending special messages when the pair are active in a connection window.

The combo-endpoint device can includes radio-communication circuitry and data-communication scheduling circuitry. The radio-communication circuitry communicates wirelessly with two different networks according to two communication protocols. To avoid various interferences, at any particular time, the radio-communication circuitry communicates with one, but not the other, of the networks. For example, the radio-communication circuitry communicates with a wireless router according to a SS-based communication protocol defined by the wireless router. The radio-communication circuitry further communicates with a wireless communication device according to a FH-based communication protocol. The FH-based communication protocol defines connection periods according to time windows and selected frequencies.

As the radio-communication circuitry communicates with one network at a time to mitigate interference, the data-communication scheduling circuitry is used to mitigate conflicts between time windows of data communication by the radio-communication circuitry with each of the two networks. For example, the data-communication scheduling circuitry monitors communication patterns of wireless data communications between the wireless router and the radio-communication circuitry. Additionally, in some embodiments, the data-communication scheduling circuitry monitors communication patterns of wireless data communications between the wireless router and other wireless devices. A wireless device refers to or includes a device associated with the wireless router and configured to communicate with the wireless router at scheduled times (e.g., a ZB sensor or another ZB router in communication with the wireless router). As an example, a wireless device is ZB device (e.g., sensor) that is associated with the ZB router. Such communication patterns monitored include the channel number, the communication-sleep period, and message block length, among other patterns. The data-communication scheduling circuitry stores the communication patterns, including data indicative of communication times of the wireless router, based on the monitoring. In some embodiments, the data-communication scheduling circuitry also monitors and stores communication patterns of various connected wireless communication devices.

The data-communication scheduling circuitry uses the stored communication patterns to schedule new communication activity to avoid conflicts between data communicated to the two networks. For example, when scheduling a new BLE link, the data-communication scheduling circuitry configures a FH-based protocol by establishing time windows that do not substantially conflict (e.g., do not conflict or avoid conflict) with the communication times of the wireless router. In specific embodiments, the data-communication scheduling circuitry reads channels used for data communication with the wireless router and blocks such channels in a channel hopping list for the FH-based protocol. The channel hopping list is specific to the new BLE link and is stored on the link master side. The data-communication scheduling circuitry uses the stored communication patterns to determine the connection periods, including time windows and window offsets that mitigate conflict with the communication times of the wireless router with the combo-endpoint device. The connection periods refer to or includes a period of time for communication according to a particular communication protocol. The time window refers to or includes the length of time for the connection period and the window offset refers to or includes the time between starting time of each connection period and/or time between connection periods.

In specific embodiments, if the wireless application allows, the connection period is defined as a multiple of communication times of the wireless router. The window offset is set as a period of time after or before the communication time of the wireless router to avoid conflict. In other embodiments, the data-communication scheduling circuitry determines a window offset that mitigates conflict with the communication times of the wireless router. For example, the data-communication scheduling circuitry identifies a pattern between the monitored communication patterns of the wireless router (e.g., communication patterns of communication times of the wireless router) and the time windows for the wireless communication device. As an example, the pattern includes at least two communication repeats according to the SS-based protocol and at least two communication repeats according to the FH-based protocol (e.g., two communications with the ZB router within two communications with the BLE device) within a common multiple period (e.g., a common period of time). Once the pattern is identified, the data-communication scheduling circuitry identifies window offsets between time windows of the FH-based protocol that results in the time windows not overlapping with the communication times of the wireless router using the collision free condition and based on the common multiple period.

Turning now to the figures, FIG. 1 illustrates an example apparatus, in accordance with the present disclosure. The apparatus, in various embodiments, includes a combo-endpoint device 100. A combo-endpoint device 100 is configured to communicate with two different networks and according to two different communication protocols. To avoid interference of communications with the two different networks, the combo-endpoint device 100 communicates with one network at a given time. In various embodiments, the different communication protocols include an SS-based protocol and an FH-based protocol. In specific examples, the networks include a ZB network and a BLE network, although embodiments are not so limited and include various different networks such as Wireless Personal Area Network (WPAN) networks, a 6lowPAN network, and/or a Thread network.

As illustrated by FIG. 1, the combo-endpoint device includes radio-communication circuitry 106 and data-communication scheduling circuitry 112. The radio-communication circuitry 106 communicates wirelessly with a wireless router according to an SS-based communication protocol defined by the wireless router. The radio-communication circuitry 106 further communicates with a wireless communication device according to an FH-based protocol. The FH-based protocol defines connection periods according to time windows and selected frequencies. The radio-communication circuitry 106 uses the FH-based modem 104 for communicating data according to an FH-based communication protocol and uses the SS-based modem (e.g., 802.15.4 modem) 108 for communicating data according to the SS-based protocol.

The combo-endpoint device 100 may communicate according to only one of the FH-based protocol or the SS-based protocol at a given time to prevent interference. In some specific embodiments, the combo-endpoint device 100 includes an integrated chip. For example, the integrated chip, which is herein sometimes referred to as an combo-communication integrated chip, is configured to communicate according to different protocols, such as communicating data (e.g., messages) according to a BLE or ZB standard, in specific embodiments, at a given time. For example, the integrated chip includes an application being executed by the application controller circuitry 116. The application includes a first application to communicate data via the SS-based protocol and a second application to communicate data via the FH-based protocol. The integrated chip further includes the data-communication scheduling circuitry 112, the FH-based modem 104, the SS-based modem 108, antenna 102, and memory circuitry 120, among other circuit components as further described and illustrated by FIG. 1.

The data-communication scheduling circuitry 112 is configured to activate communication of a particular protocol at different connection periods. For example, at the start of a time window, the data-communication scheduling circuitry 112 switches the radio-communication circuitry 106 and the requisite modem (e.g., switching between the FH-based modem 104 and the SS-based modem 108) and related protocol (e.g., the FH-based protocols circuitry 110 and/or the SS-based protocols circuitry 114). The combo-endpoint device 100 can communicate with the wireless router or the wireless communication device in the time window.

The data-communication scheduling circuitry 112 schedules time windows for the FH-based protocol that do not (substantially) conflict with time windows for the SS-based protocol. In various embodiments, the data-communication scheduling circuitry 112 monitors communication patterns between the radio-communication circuitry 106 and each of the wireless router and the wireless communication device. For example, the data-communication scheduling circuitry 112 monitors ZB communication patterns of wireless data communications between the radio-communication circuitry 106 and the wireless router. Additionally, in some embodiments, the data-communication scheduling circuitry 112 monitors ZB communication patterns of wireless data communications between the wireless router and other ZB devices (e.g., ZB sensors and other ZB routers). The ZB communication patterns can include the channel number, the communication sleep-period, and message block length. The communication patterns are stored by the data-communication scheduling circuitry 112 in the pattern registry 118 in memory circuitry 120 of the combo-endpoints. In various related embodiments, the data-communication scheduling circuitry 112 additionally monitors and stores communication patterns between the radio-communication circuitry 106 and one or more wireless communication devices in the pattern registry 118. For example, in some specific embodiments, the combo-endpoint device 100 is in wireless communication with a plurality of BLE links.

The data-communication scheduling circuitry 112 uses the stored communications patterns to schedule new communication activity to avoid conflicts between communications across the two networks. For example, when connecting with a BLE device, the data-communication scheduling circuitry 112 configures a FH-based protocol by defining connection periods according to time windows and selected frequencies for wireless communication of data between the wireless communication device and the radio-communication circuitry 106. Further, the data-communication scheduling circuitry 112 establishes the time windows to not conflict with the communication times of the wireless router. The monitored communication patterns of the wireless router, in some embodiments, include wireless data communications between the wireless router and its associated devices (e.g., ZB device), including the combo-endpoint device 100 (e.g., communication patterns of communication times of the wireless router). The communication patterns of the wireless router are used to reduce collision of a combo-endpoint device (e.g., a device with a combo-communication integrated chip) communication. For example, the monitored communication patterns are used to avoid collision between a combo-endpoint device message (from the combo-endpoint device 100 to the wireless router) and other messages of the wireless router to/from other wireless devices. This combo-endpoint device message to the wireless router may be provided after a combo-endpoint device message to a wireless communication device, such as to complete a BLE-router communication with low latency (delivery time) and low power consumption (less total active time).

In specific embodiments, when configuring a new wireless communication device link (e.g., BLE link), the data-communication scheduling circuitry 112 reads the channels used by the monitored communication patterns of the wireless router (e.g., ZB communications patterns) within the pattern registry 118. The data-communication scheduling circuitry 112 blocks these channels in a channel hopping list for the FH-based protocol. For example, the data-communication scheduling circuitry 112 provides notice to the FH-based protocols circuitry 110 to block these channels in their channel hopping list. In some embodiments, this is implemented via BLE channel Hop Sequence Adaption by setting these channels as unused Channels for this BLE link on the link master side. If the link master is a smart phone, the data-communication scheduling circuitry 112 provides notice to the application controller circuitry 116 to send a list of the wireless router-used channels to the smart phone in FH-based (e.g., BLE) communication and to use such Adaptive Frequency Hopping. Thereby, the data-communication scheduling circuitry 112 and the radio-communication circuitry 106 wirelessly communicate the channel hopping list to the wireless communication device for the FH-based protocol. The channel hopping list includes, in some embodiments, allocated frequencies and times for frequency hopping and/or channels (e.g., times and/or frequencies) that are blocked (e.g., not to be used). As previously discussed, the data-communication scheduling circuitry 112 uses the stored communication patterns to determine a connection period, including time windows and window offsets, for communication of data between the radio-communication circuitry 106 and the wireless communication device. If the FH-based application allows (e.g., the connection period is a multiple), the time window of the FH-based protocol is set as a multiple of the time windows of the SS-based communication pattern, which may reduce the total number of the combo-endpoint device 100 wake-ups and saves energy that is used in the wake-up process. Further, the window offset is determined as a period of time following (or before) the communication times of the wireless router. For example, the window offset is set with room just after the communication times of the wireless router to mitigate conflict.

In other embodiments, the FH-based application uses a connection period and/or time windows which is not a multiple of the time windows of the communication patterns of the wireless router. The data-communication scheduling circuitry 112 can determine the time windows and window offsets between time windows by identifying a pattern between the monitored communication patterns of the wireless router and time windows for the wireless communication between the wireless communication device and the radio-communication circuitry. The pattern is identified based on a common multiple period with at least two cycles of communications (e.g., at least two time windows) of the wireless communication between the wireless communication device and the radio-communication circuitry and at least two cycles of communication times of the wireless router. As a specific example, the pattern includes three communication repeats (e.g., three communication times/time windows) according to the SS-based protocol and two communication repeats according to the FH-based protocol (e.g., three communications times of the ZB router and two time windows of communication with wireless BLE communication device within a period of time). Once the pattern is identified, the data-communication scheduling circuitry 112 identifies window offsets between time windows that results in the times windows not overlapping with the communication times of the wireless router using a collision free condition in the common multiple period. A common multiple period includes or refers to a period of time in which at the least two communications (e.g., two time windows) of each protocol can occur. The above-described patterns includes three connection periods according to the SS-based protocol and two connection periods according to the FH-based protocol within a period of time. The data-communication scheduling circuitry 112 identifies window offsets to avoid or mitigate conflict by examining a collision-free condition in the common multiple period. The collision-free condition is further described and illustrated herein with regards to FIG. 3.

In various specific embodiments, the combo-endpoint device 100 has active links to a plurality of wireless communication devices. This is sometimes referred to as "wireless communication device links" or "BLE links." The data-communication scheduling circuitry 112 monitors communication patterns (e.g., connection intervals) of the active links and uses the collision-free condition to find the time windows and window offsets for each of the plurality of wireless communication devices that do not conflict with the communication of the wireless router. For example, the data-communication scheduling circuitry 112 configures the FH-based protocol for communication between each of the plurality of wireless communication devices and the radio-communication circuitry 106 by providing time windows and/or window offsets for the FH-based protocol for each of the wireless communication devices and which do not conflict with the communication times of the wireless router.

The connection periods for communicating with the one or more wireless communication devices can be set by using a link layer connection update procedure. For example, BLE time windows and window offsets are set using a BLE link layer Connection Update Procedure via a BLE data message with LL_CONNECTION_UPDATE_REQ PDU. This update is done when setting a new connection (after initial faster connection for exchange parameters and encryption keys), or updating current connection when new conflicts are detected. This update can be initiated by the combo-endpoint device 100 or by a BLE communication device.

Figure 2:
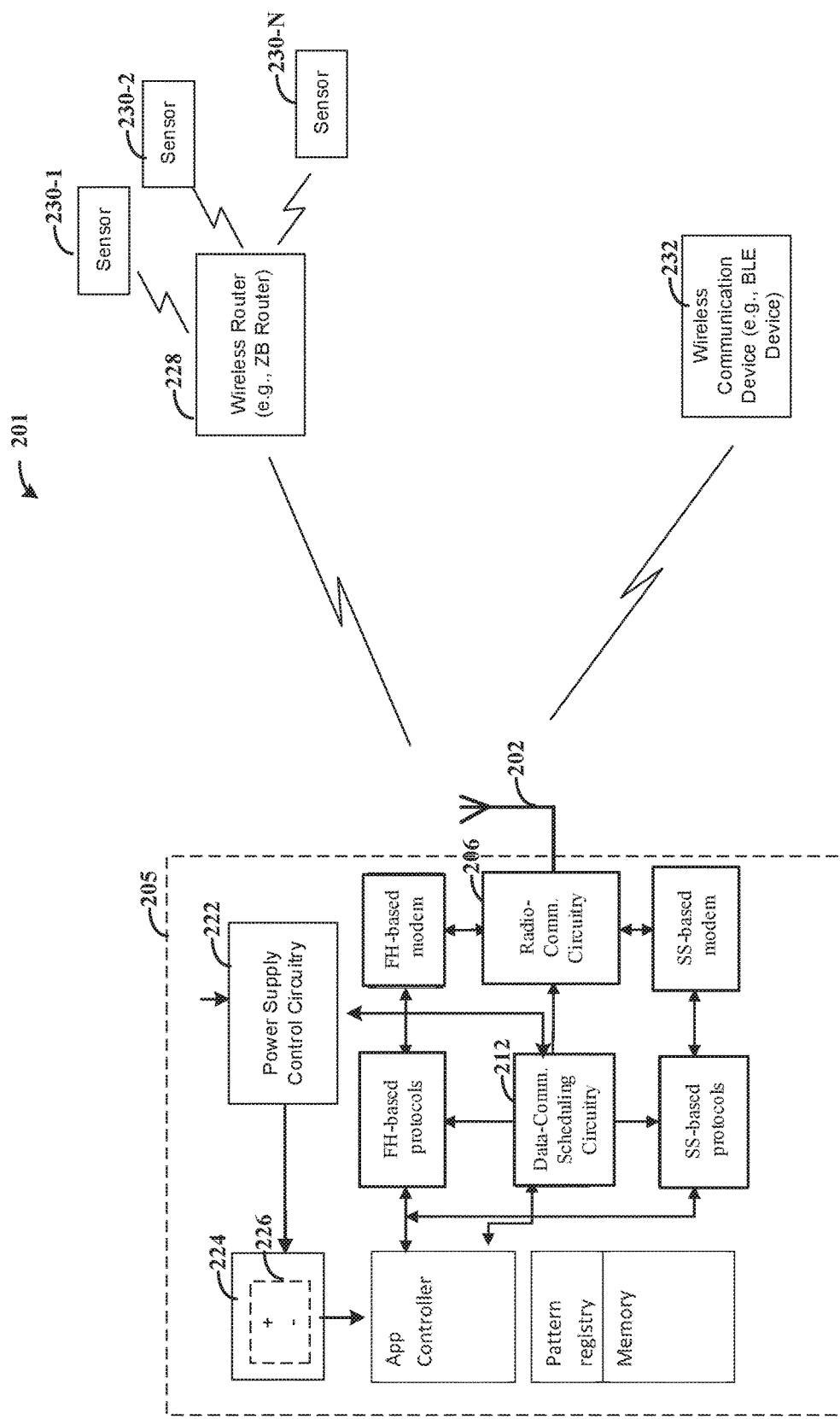
FIG. 2 is an apparatus-level diagram illustrating an example of a combo-endpoint device wirelessly communicating between each of a wireless router and a wireless communication device, in accordance with the present disclosure.

FIG. 2 is an apparatus-level diagram illustrating an example of a combo-endpoint device wirelessly communicating between each of a wireless router and a wireless communication device, in accordance with the present disclosure. As illustrated, the apparatus 201 includes a combo-endpoint device 205, a wireless router 228, and a wireless communication device 232.

The combo-endpoint device 205 includes the circuitry previously described by FIG. 1. In various embodiments, the combo-endpoint device 205 is an integrated chip with one set of radio-communication circuitry 206 and one antenna 202 configured to communicate according to two different communication protocols. Further, as previously discussed, the integrated chip includes data-communication scheduling circuitry 212 to schedule communications times between networks corresponding to the different communication protocols, such that the scheduled times for communication do not conflict.

In various specific embodiments, the combo-endpoint device 205 further includes a power source 224 and power control circuitry 222. The power source 224 provides power to the combo-endpoint device 205. For example, the power source 224 provides power to the application controller circuitry and/or the data-communication scheduling circuitry 212, in some embodiments, via power-supply pins 226. Example power sources include a battery, generator, solar power converter, or other circuitry configured to convert one form of energy to another. The power control circuitry 222 controls the connection of the power source 224 to the combo-endpoint device 205. The power source 224 can be internal or external to the combo-endpoint device 205 in various embodiments. In various embodiments, the data-communication scheduling circuitry 212 is in communication with the power control circuitry 222. Based on the monitored communication patterns and the time windows for the wireless communications (e.g., the coordinated communications), the data-communication scheduling circuitry 212 controls the power control circuitry 222 to optimize the active mode and the current consumption.

As illustrated by FIG. 2, the combo-endpoint device 205 communicates across two different networks. The different networks operate according to different communication protocols. For example, the combo-endpoint device 205 communicates with a wireless router 228 according to an SS-based protocol and a wireless communication device 232 according to an FH-based protocol. The SS-based protocol, in specific embodiments, includes a direct or parallel-sequence SS-based protocol based on an IEEE 802.15.4 standard. The FH-based protocol includes a FH spread spectrum (FHSS)-based protocol. The data-communication scheduling circuitry 212 schedules and monitors communication patterns for wireless data communications between the combo-endpoint device 205 and the two networks to mitigate collision of communicate times. For example, the data-communication scheduling circuitry 212 establishes coordinated wireless communication schedules for the radio-communication circuitry to communicate with both the wireless router 228 and the wireless communication device 232.

In specific embodiments, the two networks include an IEEE 802.15.4 based network and a Bluetooth based network. For example, the two networks include a ZB network and a BLE network, although embodiments are not so limited.

The wireless router 228 can be a ZB router in a ZB network. Typically in ZB networks, one or more sensors 230-1, 230-2, 230-N (herein generally referred to as "ZB sensors 230" for ease of reference) wake-up periodically and send a message to the ZB router (e.g., wireless router 228) to report sensed information, such as temperature. If the ZB router does not send an acknowledgement (e.g., ACK message) to the sensor to confirm receipt of the message, the sensor may retry sending for a few times. After reporting, the ZB sensors 230 transition from the awake mode to a sleep mode to save energy until the next communication period. For a new ZB sensor or a ZB sensor that has lost connection to the ZB network, the sensor starts an association procedure to find its ZB router to join the ZB network via a set of messages before beginning the above-described sleep-report-sleep cycle behavior. Typically, ZB routers are statically mounted in place with power-line energy supply, while ZB sensors are statically mounted and run in a stable network topology and regularly communicate with the ZB router. In specific embodiments, the combo-endpoint device 205 is a ZB sensor. In other embodiments, the combo-endpoint device 205 is used to communicate with the ZB router to obtain data from the ZB sensors 230.

In related specific embodiments, the wireless communication device 232 is a BLE device. For example, the wireless communication device 232 and the combo-endpoint device 205 form a BLE device pair, e.g., a master device and slave device. In some embodiments, the combo-endpoint device 205 is the master device and the wireless communication device 232 is the slave device. In other embodiments, the reverse is true, and the combo-endpoint device 205 is the slave device and the wireless communication device 232 is the master device. BLE device pairs communicate by first setting up a BLE connection via BLE advertising procedures and communicating periodically following the set-up connection. If a BLE device completes communication during a connection period, it falls asleep until the next connection period. The BLE device pair negotiate the time window and window offset in the set-up procedure. Further, the BLE device pair reset the time window and window offset by sending special messages when the pair are in an active time window.

The wireless communication device 232 can include an integrated chip, such as combo-communication integrated chip. The combo-communication integrated chip includes another data-communication scheduling circuitry and another radio-communication circuitry to communicate wirelessly with the radio-communication circuitry via the FH-based protocol and the other data-communication scheduling circuitry. The scheduler function, in some embodiments, is performed by the wireless communication device 232 to avoid conflict and to minimize the active time of the combo-endpoint device. Besides the functions to optimize the connection period and window offset using the communication patterns of the combo-endpoint device, the scheduler function includes asking the combo-endpoint device 205 or other connected ZB/BLE devices to get the communication patterns of the combo-endpoint device 205.

In specific embodiments, the other data-communication scheduling circuitry monitors communication patterns of the other radio-communication circuitry and stores data indicative of communication times. Further, the other data-communication schedule circuitry configures the FH-based protocol for wireless communication between the wireless communication device 232 and the combo-endpoint device 205 by providing time windows for the FHSS-based protocol which do not substantially conflict (e.g., avoids or does not conflict) with the communication times of the radio-communication circuitry.

Figure 3:
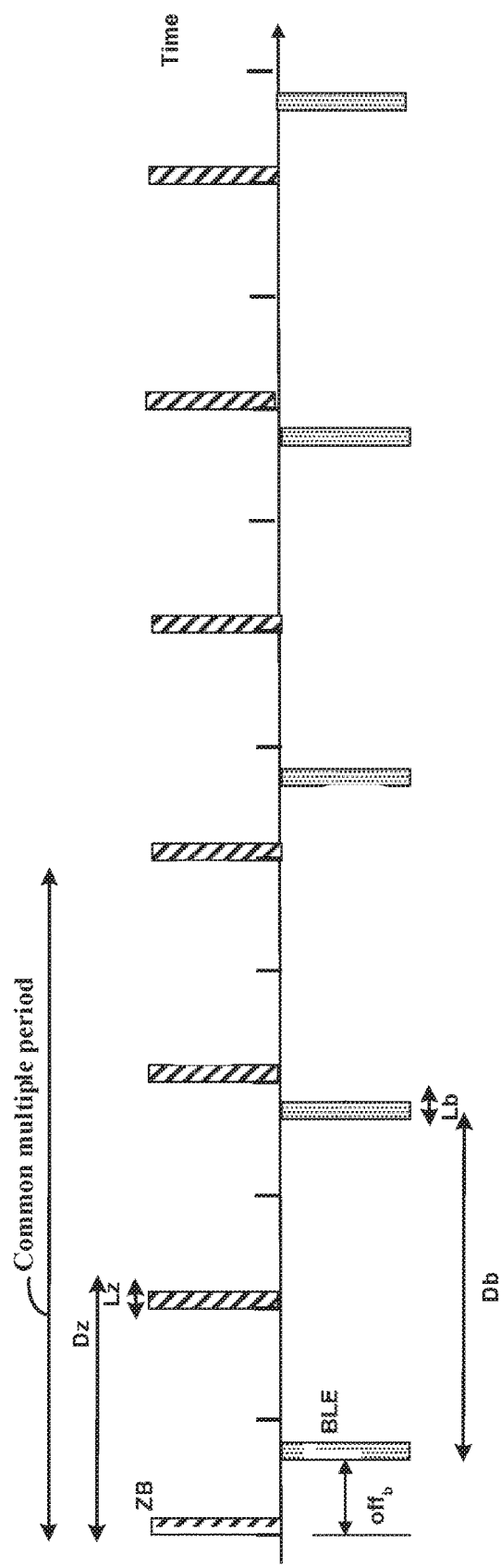
FIG. 3 is an example configuration of wireless communications of a combo-endpoint device between each of a wireless router and a wireless communication device according to two communication protocols, in accordance with the present disclosure.

FIG. 3 is an example configuration of wireless communications 303 of a combo-endpoint device between each of a wireless router and a wireless communication device according to two communication protocols, in accordance with the present disclosure. As illustrated by FIG. 3, in various embodiments, the FH-based application uses a connection period which is not a multiple of the communication patterns (e.g., time windows) of the wireless router. For example, the BLE connection periods have time windows which are not a multiple of the time windows of the ZB connection periods.

In such embodiments, the combo-endpoint device (using the data-communication scheduling circuitry) determines a pattern between the monitored communication patterns of the wireless router (e.g., the ZB router) and the time windows for the FH-based protocol (e.g., BLE). The pattern of the two communications, in various embodiments, includes a common multiple period with at least two cycles of each communication within the common multiple period. A cycle of a communication (e.g., Dz and Db) can include or refer to a length of time between the start of a time window for the respective protocol and the start of a subsequent time window for the respective protocol. Using an example of two minutes for a cycle of a ZB communication (Dz) and three minutes for a cycle of a BLE communication (Db), the common multiple period includes six minutes (two minutes multiplied by three minutes equals six minutes). The combo-endpoint device further identifies a window offset $off_b$ to avoid or mitigate conflict by examining a collision-free condition in the common multiple period. An example collision-free condition is illustrated by:

Pattern repeats every Dz* Db/cdiv; with integers N, M, Dz=N*cdiv, Db=M*cdiv;
  Collision if: $j*Dz-Lb<offb+i*Db<j*Dz+Lz$, with $Lz<offb<Dz-Lb$, i=[0,M], j=[0,N]
Collision-free condition:
  Find offb not in ranges [(j*Dz−i*Db)−Lb, (j*Dz−i*Db)+Lz], i=[0,M], j=[0,N]
If Dz=k*Db or k*Dz=Db, collision-free condition is $Lz<offb<Dz-Lb$, wherein Dz is based on a length of time for a cycle of a ZB communication and Db is based on a length of time for a cycle of a BLE time communication. Further, Lz is based on a length of a ZB message taking into account the data packet, carrier sense, multiple access/collision avoidance (CSMA) back-off, and receiving ACK message. Lb is based on a length of a BLE message (e.g., data packet) and taking into account the response.

As previously discussed, if the combo-endpoint device has active links to multiple wireless communication devices, the device examines the cycles (connection intervals) of these active links using the collision-free condition to find the best window offset for each of the active links that do not substantially conflict (e.g., do not conflict or avoid conflict) with the communication times of the wireless router.

Figure 4:
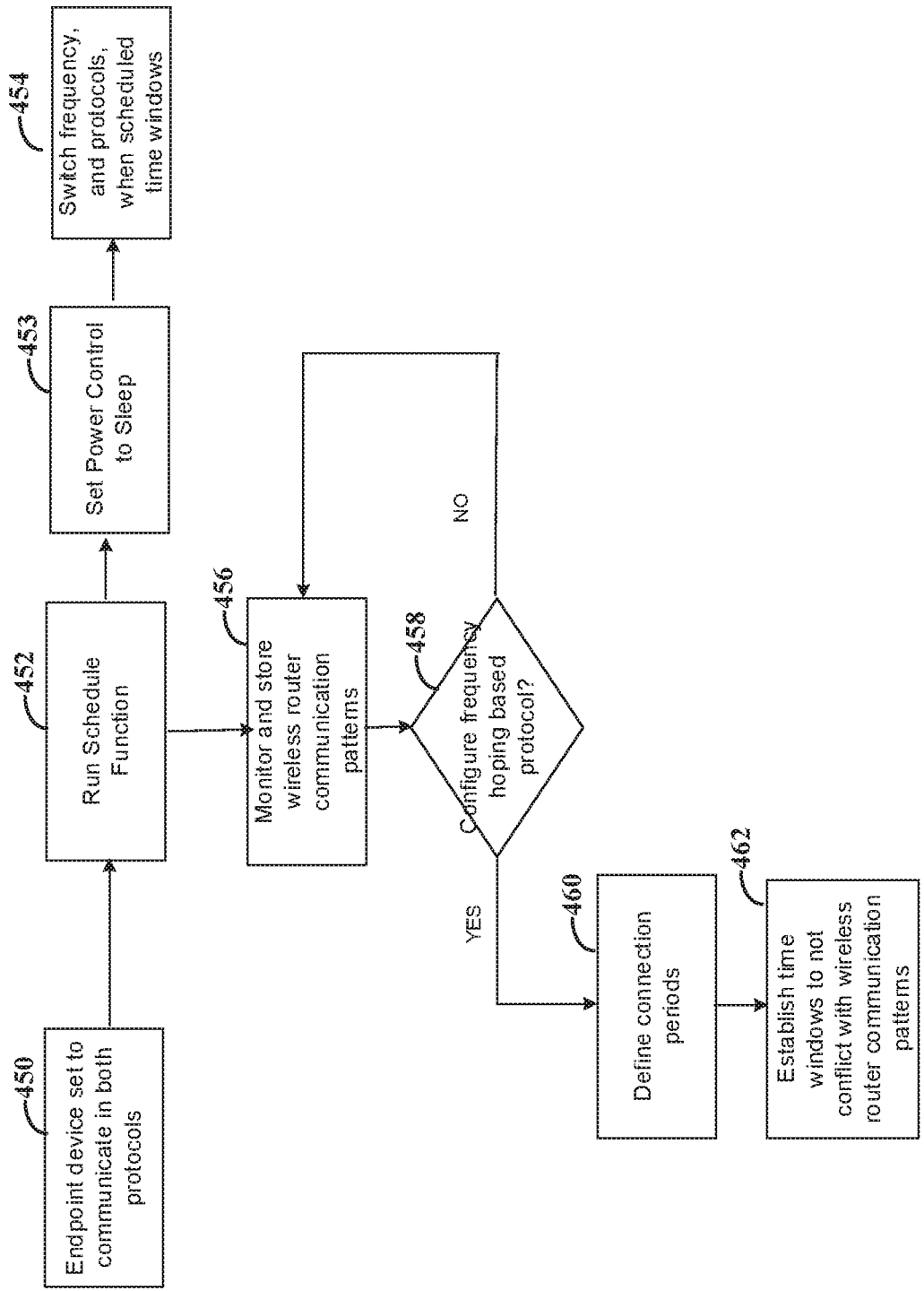
FIG. 4 is a flow chart illustrating an exemplary set of activities and/or data flow for an apparatus of the type implemented in a manner consistent with FIG. 1 and FIG. 2, in accordance with the present disclosure.

FIG. 4 is a flow chart illustrating an exemplary set of activities and/or data flow for an apparatus of the type implemented in a manner consistent with FIG. 1 and FIG. 2, in accordance with the present disclosure. The data-communication scheduling circuitry, such as illustrated by FIG. 1 and FIG. 2, can be implemented using any number of different algorithms. FIG. 4 illustrates various specific and/or experimental embodiments characterizing different ways to implement such an algorithm.

An example process or algorithm performed by the data-communication scheduling circuitry includes monitoring communication patterns of wireless data communications between a wireless router and radio-communication circuitry of a combo-endpoint device, storing data indicative of communication times of the wireless router based on the monitored communication patterns, and configuring a FH-based protocol. For example, in specific embodiments, the data-communication scheduling circuitry performs an algorithm to configure a FH-based protocol including defining connection periods according to time windows and selected frequencies for wireless communication of data between the wireless communication device and the radio-communication circuitry and establishing the time windows to not conflict with the communication times of the wireless router.

Another more specific process or algorithm includes monitoring communication patterns of wireless data communications between a ZB router and radio-communication circuitry of a combo-endpoint device and wireless data communications between the ZB router and other ZB devices (e.g., ZB sensors and/or other ZB routers), storing data indicative of communication times of the ZB router, and establishing coordinated wireless communication schedules for the radio-communication circuitry to communicate with both the BLE device and the ZB router by: configuring a FHSS-based protocol for communication between the BLE device and the combo-endpoint device with selected time windows for the FHSS-based data communications, and providing the selected time windows at intervals that do not substantially conflict (e.g., avoid or do not conflict) with the communication times of the ZB router.

A more detailed experimental algorithm as illustrated by FIG. 4 would affect such communication by the data-communication scheduling circuitry performing a scheduling function. For example, at 450, the combo-endpoint device is set to communicate in both a FH-based protocol and a SS-based protocol. In various embodiments, the communication is across two different networks, such as a BLE network and a ZB network.

At 452, the data-communication scheduling circuitry of the combo-endpoint device performs the scheduled function. For example, at 456, the data-communication scheduling circuitry monitors and stores wireless router communication patterns. Wireless router communication patterns includes or refers to communications of data between the wireless router and its associated devices, including the combo-endpoint device and, optionally, in some embodiments, other wireless devices (e.g., ZB sensors and other ZB routers). Example patterns of the communications include channel number, communication-sleep period, message block length, and communication times, among other information. The data-communication scheduling circuitry stores the communication patterns in a pattern registry in memory of the combo-endpoint device. In some specific embodiments, the data-communication scheduling circuitry provides a message to the application processor to retrace the wireless router network communication patterns from the wireless router. For example, the application processor provides a message to a ZB router to retrieve ZB network communication patterns including wireless data communications between the ZB router and other ZB sensors.

In various specific embodiments, the data-communication scheduling circuitry further monitors and stores communication patterns of wireless communication devices. Communication patters of wireless communication devices includes or refers to communication of data between the wireless communication devices and the combo-endpoint device. Example patterns of the communications include frequency/hopping pattern, time windows, window offsets, message block length, among other information. At 458, the data-communication scheduling circuitry determines if an FH-based protocol is being configured and/or established. The determination, in various embodiments, includes identifying a connection with a new wireless communication device (e.g., a new link or BLE link) is being established. Alternatively and/or in addition, the determination includes identifying a collision between communication with the wireless router and stored (e.g., scheduled) communication with a wireless communication device. If no FH-based protocols are being configured, the data-communication scheduling circuitry continues to monitor and store communication patterns, at 456.

In response to determining a FH-based protocol is to be configured, at 460, the data-communication scheduling circuitry defines connections periods for communication between the wireless communication device and the radio-communication circuitry of the combo-endpoint device. For example, the connection periods are defined according to time windows and selected frequencies. Further, at 462, the data-communication scheduling circuitry establishes the time windows to not conflict with the wireless router communication patterns.

In specific embodiments, the FH-based protocol is configured by determining the time windows and window offsets as a multiple of the communication patterns of the wireless router. The window offset, in such embodiments, is determined as a period of time following or before the communication times of the wireless router. In other specific embodiments, the FH-based protocol is configured by identifying a pattern between the time windows of the wireless router and time windows (e.g., time for connection) of wireless data communication between the wireless communication device and the combo-endpoint device. Identifying the pattern, in various embodiments, includes identifying an overlap (e.g., conflict) between at least two communication times of the wireless router and at least two time windows for the FH-based protocol that are within a common multiple period (e.g., a common period of time). Further, the window offsets are identified based on the identified pattern and result in the time windows not overlapping with the communication times of the wireless router. Using the above provided example illustrated by FIG. 3, a common multiple period includes three ZB time windows and two BLE time windows.

At 453, the data-communication schedule circuitry sets the power supply control circuitry of the combo-endpoint device to sleep for periods of time between time windows of both protocols. For example, the power supply control circuitry is set to sleep between time windows of the FH-based protocols and time windows of the SS-based protocols. Further, at 454, at the start of the time windows, the data-communication scheduling circuitry switches the radio-communication circuitry and the requisite modem (e.g., switching between the FH-based modem and the SS-based modem) and related protocol (e.g., the FH-based protocols and/or the SS-based protocols). The applications can communicate with the wireless router or the wireless communication device in the time window.

Figure 5:
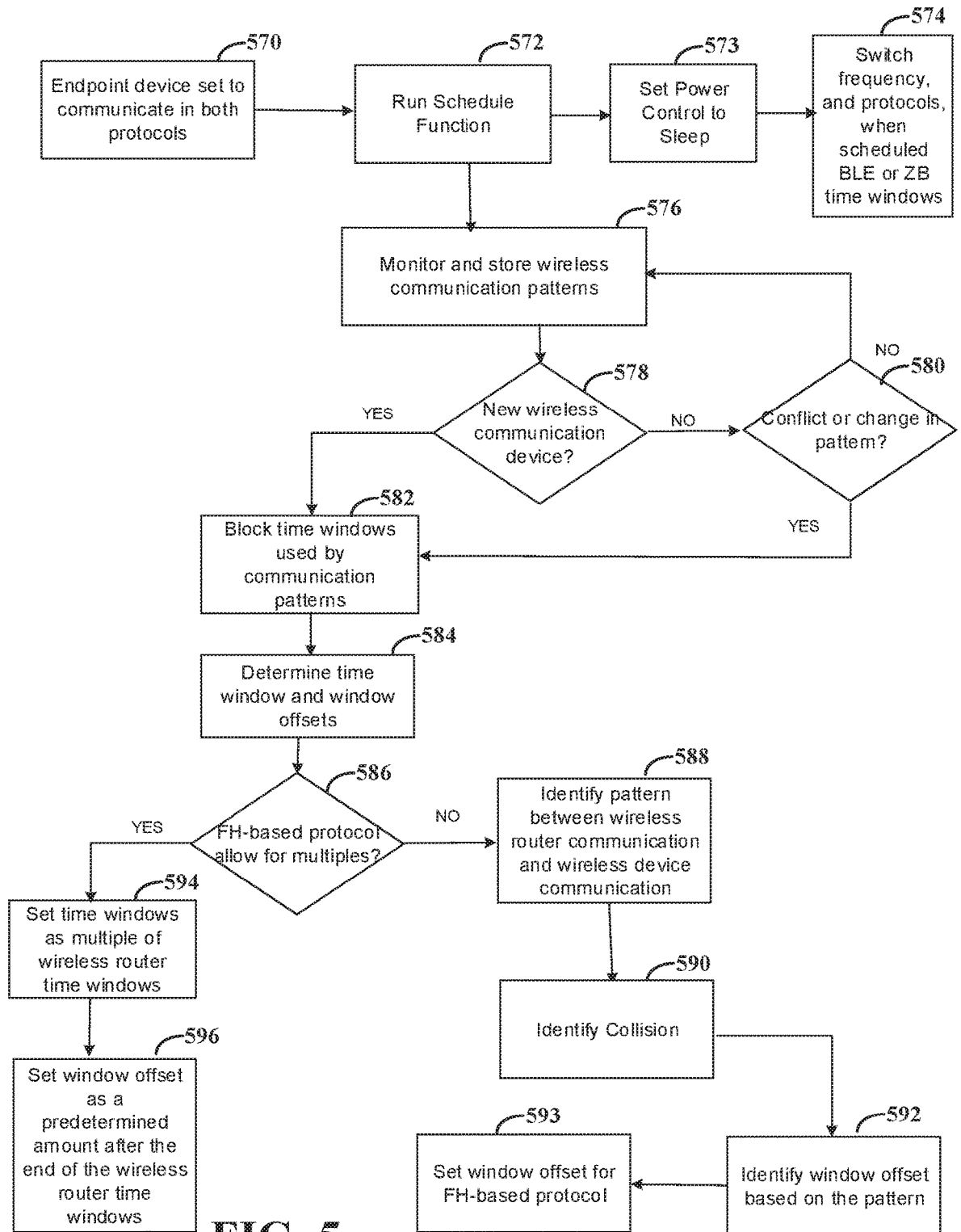
FIG. 5 is a flow chart illustrating an exemplary set of activities and/or data flow for an apparatus of the type implemented in a manner consistent with FIG. 1 and FIG. 2, in accordance with the present disclosure.

FIG. 5 is a flow chart illustrating an exemplary set of activities and/or data flow for an apparatus of the type implemented in a manner consistent with FIG. 1 and FIG. 2, in accordance with the present disclosure. As previously described in connection with FIG. 4, the data-communication scheduling circuitry, such as illustrated by FIG. 1 and FIG. 2, can be implemented using any number of different algorithms. FIG. 4 illustrates various specific and/or experimental embodiments characterizing different ways to implement such an algorithm.

As previously discussed, an example process or algorithm performed by the data-communication scheduling circuitry includes monitoring communication patterns of wireless data communications between a wireless router and radio-communication circuitry of a combo-endpoint device and wireless data communications between the wireless router and, in some embodiments, other wireless devices (e.g., ZB sensors and other ZB routers), storing data indicative of communication times of the wireless router based on the monitored communication patterns, and configuring a FH-based protocol.

A more detailed experimental algorithm as illustrated by FIG. 5 would affect such communication by the data-communication scheduling circuitry determining if a conflict exists or a change in a communication pattern occurred between the combo-endpoint device and one or more of the wireless router or wireless communication device. Other detailed experimental and/or more-specific algorithms as illustrated by FIG. 5 affect such communication by the data-communication scheduling circuitry by determining if the wireless communication application allows for multiples of the wireless device communication pattern. If the application does allow for multiples, the FH-based protocol is configured by determining the time windows and window offsets as a multiple of the communication patterns of the wireless router. The window offset, in such embodiments, are determined as a period of time following or before the communication times of the wireless router. If the application does not allow for multiples, the FH-based protocol is configured by identifying a pattern between the communication patterns of the wireless router and time windows (e.g., time for connection) of wireless data communication between the wireless communication device and the combo-endpoint device (e.g., a common period of time of at least two time windows for the wireless router communication and at least two times windows of the wireless communication device communication). Further, the window offsets are identified based on the identified pattern and that result in the time windows not overlapping with the communication times of the wireless router.

Another more detailed experimental algorithm as illustrated by FIG. 5 would affect such communication by the data-communication scheduling circuitry performing a schedule function. For example, at 570, the combo-endpoint device is set to communicate in both a FH-based protocol and a SS-based protocol. In various embodiments, the communication is across two different networks, such as a BLE network and a ZB network.

At 572, the data-communication scheduling circuitry of the combo-endpoint device performs the schedule function. For example, at 576, the data-communication scheduling circuitry monitors and stores wireless router communication patterns. In some specific embodiments, the data-communication scheduling circuitry provides a message to the application processor to retrace the wireless router network communication patterns from the wireless router. For example, the application processor provides a message to a ZB router to retrieve ZB network communication patterns. In various specific embodiments, the data-communication scheduling circuitry further monitors and stores communication patterns of wireless communication devices.

At 578, the data-communication scheduling circuitry determines if a connection with a new wireless communication device (e.g., a new link or BLE link) is being established. If a new connection is not being established, at 580, data-communication scheduling circuitry determines if a conflict between communication with the wireless router and stored (e.g., scheduled) communication with a wireless communication device and/or if a change in a communication pattern has occurred. For example, in some embodiments, the wireless router changes a communication pattern or the wireless device begins negotiations to change communication patterns (as previously discussed). If no conflicts or changes to data communication patterns are identified, the data-communication scheduling circuitry continues to monitor and store communication patterns, at 576.

In response to determining a new connection to a wireless communication device is being established, a conflict and/or change in a communication pattern has occurred, at 582, the data-communication scheduling circuitry reads channels used for data communication with the wireless router and blocks such channels in a channel hopping list for the FH-based protocol. The channel hopping list is specific to the particular wireless communication device link and is stored on the link master side. In some embodiments, the blocking channels includes or refers to updating an existing channel hopping list. For example, if the wireless router changes the communication patterns, existing communication patterns for wireless communication devices are re-scheduled by updating the channel hopping list and re-negotiating time windows and window offsets.

Further, at 584, the data-communication scheduling circuitry defines connection periods for communication between the wireless communication device and the radio-communication circuitry of the combo-endpoint device. For example, the connection periods are defined according to times windows and selected frequencies and include window offsets, as previously discussed. The data-communication scheduling circuitry establishes the time windows to not conflict with the wireless router communication patterns.

For example, the data-communication scheduling circuitry determines if the wireless application (e.g., BLE application) allows for the time windows of the FH-based protocol to be defined as a multiple of communication times of the wireless router, at 586. In response to determining the wireless application does allow for multiples, at 594, the data-communication scheduling circuitry determines the time windows and window offsets as a multiple of the communication times of the wireless router. The window offset, in such embodiments, are determined by the data-communication scheduling circuitry as a period of time following or before the communication times of the wireless router and, at 596, the determined window offset is set for the FH-based protocol.

If the wireless application does not allow for multiples, at 588, the data-communication scheduling circuitry identifies a pattern between the communication times of the wireless router and time windows of wireless data communication between the wireless communication device and the combo-endpoint device. Identifying the pattern, in various embodiments, includes identifying at least two communication repeats according to the SS-based communication protocol and at least two communication repeats according to the FHSS-based communication protocol within a common multiple period (e.g., a time period with at least two communications with the ZB router and at least two communications with the wireless BLE communication device).

At block 590, in response to the identified pattern, the data-communication scheduling circuitry identifies a conflict between the two protocols within the pattern. Based on the identified conflict, at 592, the data-communication scheduling circuitry determines the window offsets in the identified pattern that results in the time windows of the FH-based protocol not overlapping with the communication times of the wireless router and at 593, sets the window-offsets for the FH-based protocol. In specific embodiments, the data-communication scheduling circuitry identifies window offsets between time windows of the FH-based protocol that results in the time windows not overlapping with the communication times of the wireless router using the collision free condition in the common multiple period.

At 573, the data-communication schedule circuitry sets the power supply control circuitry of the combo-endpoint device to sleep for periods of time between time windows. For example, the power supply control circuitry is set to sleep between time windows of the FH-based protocols and time windows of the SS-based protocols. Further, at 574, at the start of the time windows, the data-communication scheduling circuitry switches the radio-communication circuitry and the requisite modem (e.g., switching between the FH-based modem and the SS-based modem) and related protocol (e.g., the FH-based protocols and/or the SS-based protocols). The applications can communicate with the wireless router or the wireless communication device in the time window.

In accordance with a number of embodiments, the combo-endpoint device has active links to a plurality of wireless communication devices. The data-communication scheduling circuitry monitors communication patterns (e.g., connection intervals) of these active links using the collision-free condition to find the best time windows and window offsets for each of the plurality of wireless communication devices. For example, the data-communication scheduling circuitry configures the FH-based protocol for communication between each of the plurality of wireless communication devices and the radio-communication circuitry by providing time windows and/or window offsets for the FFHS-based communication protocol for each of the wireless communication devices and which do not substantially conflict (e.g., avoids or do not conflict) with the communication times of the wireless router. The connection periods for communicating with the one or more wireless communication devices are set by using a link layer connection update procedure. For example, BLE time windows and window offsets are set using the BLE link layer Connection Update Procedure via a BLE data message with LL_CONNECTION_UPDATE_REQ PDU. This update is done when setting a new connection (after initial faster connection for exchange parameters and encryption keys), or updating a current connection when new conflicts are detected. This update can be initiated by the combo-endpoint device or by the BLE smart phone.

For the purposes of this document, the following terms and definitions apply: communication protocol includes or refers to descriptions of data message formats and rules used to exchange data between devices; FH-based protocol includes or refers to a protocol that transmits messages by switching a carrier among many frequency channels; FHSS-based protocol includes or refers to a protocol that transmits messages by switching a carrier among many frequency channels, using a sequence known by both transmitter and receiver, sometimes used by BLE networks or other Bluetooth networks; SS-based protocol includes or refers to a protocol in which the frequency of the transmitted signal is varied; DSS-based protocol includes or refers to a protocol that transmits messages according to a spread spectrum modulation technique in which the message signal is used to modulate a bit sequence referred to as "Pseudo Noise (PN) code" which consists of pulses that are of a shorter duration than the pulse duration of the message signal; PSS-based protocol includes or refers to a protocol that transmits messages according to a spread spectrum modulation technique in which the message signal is sent in parallel with a superposition of orthogonal sequences with M-ary modulation; wireless router includes or refers to circuitry configured to forward data packets between devices and/or networks and configured to communicate according to a communication protocol; ZB router includes or refers to circuitry configured to forward data packets between devices and/or networks and configured to communicate according to a DSS-based protocol; wireless communication device includes or refers to circuitry, including radio-communication circuitry, configured to communicate according to a FH-based protocol; BLE device includes or refers to circuitry, including radio-communication circuitry, configured to communicate according to a FHSS-based protocol; BLE device pair includes or refers to a master device and a slave device both of which communicate according to a BLE protocol that are paired or bonded together; wireless communication device link or BLE link refers to or includes active communication pairing between the combo-endpoint device and a wireless communication device or BLE device; Channel Hopping List refers to or includes allocated frequencies and times for frequency hopping and/or channels (e.g., times and/or frequencies) that are blocked (e.g., not to be used); combo-endpoint device refers to or includes circuitry configured to communicate with two different networks and according to two different communication protocols; combo-integrated chip refers to or includes a semiconductor wafer including common radio-communication circuitry and a single antenna configured to communicate with two different networks and according to two different communication protocols; communication patterns refers to or includes patterns of communication between at least two devices and/or across a network; connection periods refers to or includes a period of time for communication according to a particular communication protocol; time windows refers to or includes a length of time for a connection period; window offsets refers to or includes a time offset of the time windows of the FH-based protocol that are before or after a communication time of the wireless router; frequencies refers to or includes an electromagnetic wave frequency; communication channel refers to or includes a bandwidth in Hertz or data rate in bits per second for communication of data; radio-communication circuitry refers to or includes communication circuitry configured to communicate wirelessly with devices; data-communication scheduling circuitry refers to or includes circuitry configured to establish coordinated communication schedules between two networks that communicate according to two different communication protocols.

Embodiments may include the features recited in the following numbered clauses:

1. A method for communicating between a combo-endpoint device, a wireless router, and a wireless communication device, the method comprising:

monitoring communication patterns of wireless data communications between a wireless router and radio-communication circuitry of a combo-endpoint device;

storing data indicative of communication times of the wireless router based on the monitored communication patterns; and configuring a frequency-hopping (FH)-based protocol by defining connection periods according to time windows and selected frequencies for wireless communication of data between the wireless communication device and the radio-communication circuitry, and by establishing the time windows to not substantially conflict with the communication times of the wireless router.

2. The method of clause 1, further including:

monitoring communication patterns between the wireless router and other wireless devices; and wherein configuring the FH-based protocol further includes determining the time windows and window offsets between the time windows as a multiple of the communication times of the wireless router and the radio-communication circuitry.

3. The method of clause 2, further including determining the window offsets between the time windows of the wireless communication of data as a period of time following or before the communication times of the wireless router.

4. The method of any of clauses 1 to 3, wherein configuring the FH-based protocol further includes determining the time windows and window offsets between the time windows by:

identifying a pattern between the communication times of the wireless router and the time windows for the wireless communication of data between the wireless communication device and the radio-communication circuitry; and identifying window offsets between the time windows that results in the time windows not overlapping with the communication times of the wireless router based on the identified pattern.

5. The method of clause 4, wherein identifying the pattern includes identifying a common multiple period with at least two cycles of the wireless communication between the wireless communication device and the radio-communication circuitry and at least two cycles of communication times of the wireless router.

6. An apparatus comprising:

radio-communication circuitry configured and arranged to communicate wirelessly with a wireless router according to a spread spectrum (SS)-based protocol defined by the wireless router, and wirelessly with a wireless communication device via a frequency hopping (FH)-based protocol, which defines connection periods according to time windows and selected frequencies, for communication of data between the wireless communication device and the radio-communication circuitry; and data-communication scheduling circuitry configured and arranged to (1) monitor communication patterns of wireless data communications between the wireless router and the radio-communication circuitry to store data indicative of communication times of the wireless router, and (2) configure the FH-based protocol for communication between the wireless communication device and the radio-communication circuitry by providing time windows for the frequency-hopping based protocol which do not substantially conflict with the communication times of the wireless router.

7. The apparatus of clause 6, wherein the data-communication scheduling circuitry is further configured and arranged to:

monitor communication patterns of wireless data communications between the wireless router and other wireless devices; and identify window offsets between the time windows that results in the time windows not overlapping with the communication times of the wireless router based on an identified pattern between the monitored communication patterns of communication times of the wireless router and the time windows for the FH-based protocol.

8. The apparatus of any of clauses 6 or 7, wherein the data-communication scheduling circuitry is further configured and arranged to:

determine a pattern between the communication times of the wireless router and the time windows for the frequency-hopping based protocol; and identify an overlap between the communication times of the wireless router and the times windows within the pattern.

9. The apparatus of clause 8, wherein the data-communication scheduling circuitry is further configured and arranged to identify window offsets between the time windows using a collision-free condition based on the communication times of the wireless router, the time windows, and the determined pattern.

10. The apparatus of clause 8 or clause 9, wherein the data-communication scheduling circuitry is further configured and arranged to identify window offsets between the time windows using a collision-free condition including:

Find $_{offb}$ not in ranges [(j*Dz−i*Db)−Lb, (j*Dz−i*Db)+Lz], i=[0,M], j=[0,N]

If Dz=k*Db or k*Dz=Db, collision-free condition is Lz<offb<Dz−Lb.

11. The apparatus of any of clauses 6 to 10, wherein the data-communication scheduling circuitry is further configured and arranged to monitor wireless data communication between a plurality of wireless communication devices and the radio-communication circuitry and configured the FH-based protocol for communication between each of the plurality of wireless communication devices and the radio-communication circuitry by providing time windows for the FH-based protocol for each of the plurality of wireless communication devices and which do not substantially conflict with the communication times of the wireless router.

12. The apparatus of any of clauses 6 to 11, wherein the data-communication scheduling circuitry is configured and arranged to identify window offsets as a period of time following the communication times of the wireless router that results in the time windows not overlapping with the communication times of the wireless router and based on an identified pattern between at least two communication times of the wireless router and at least two of the time windows for the FH-based protocol.

13. An apparatus comprising:

radio-communication circuitry configured and arranged to communicate wirelessly with a ZigBee router according to a direct-sequence spread spectrum (DSS)-based network protocol defined by the ZigBee router, and wirelessly with a wireless communication device via a frequency-hopping spread spectrum (FHSS)-based protocol which defines connection periods, in time windows, for communication of data between the wireless communication device and the radio-communication circuitry; and data-communication scheduling circuitry configured and arranged to (1) monitor communication patterns of wireless data communications between the ZigBee router and the radio-communication circuitry to store data indicative of communication times of the ZigBee router, and (2) establish coordinated wireless communication schedules for the radio-communication circuitry to communicate with both the wireless communication device and the ZigBee router by configuring the FHSS-based protocol for communication between the wireless communication device and the combo-endpoint device with selected time windows for FHSS-based data communications and by providing the selected time windows at intervals that do not substantially conflict with the communication times of the ZigBee router.

14. The apparatus of clause 13, wherein the data-communication scheduling circuitry is further configured and arranged to monitor communication patterns of wireless data communications between the ZigBee router and its associated ZigBee devices, the apparatus further including:

a power source configured and arranged to provide power to the radio-communication circuitry; and a power control circuit configured and arranged to control connection of the power source to the radio-communication circuitry.

15. The apparatus of clause 13 or 14, wherein the data-communication scheduling circuitry is further configured and arranged to allocate frequencies and times for frequency hopping according to the monitored communication patterns of the wireless data communications between the ZigBee router and the radio-communication circuitry by blocking channels of the monitored communication patterns in a channel hopping list for the FHSS-based protocol.

16. The apparatus of clause 15, wherein the radio-communication circuitry and the data-communication scheduling circuitry are further configured and arranged to wirelessly communicate the channel hopping list, which includes the allocated frequencies and times for frequency hopping, to the wireless communication device.

17. The apparatus of any of clauses 13 to 16, wherein the data-communication scheduling circuitry is further configured and arranged to identify window offsets between the time windows using a collision-free condition based on a pattern between the communication times of the ZigBee router and the time windows for the FHSS-based protocol in a common multiple period that results in the time windows not overlapping with the communication times of the ZigBee router.

18. The apparatus of any of clauses 13 to 17, wherein the radio-communication circuitry and the data-communication scheduling circuitry are further configured and arranged to communicate the time windows and window offsets for the FHSS-based protocol to the wireless communication device.

19. The apparatus of any of clauses 13 to 18, further including the wireless communication device comprising:
    a combo-communication integrated chip including:
        another radio-communication circuitry configured and arranged to communicate wirelessly with the radio-communication circuitry via the FHSS-based protocol; and
    a data-communication scheduling circuitry configured and arranged to (1) monitor communication patterns of the radio-communication circuitry and to store data indicative of communication times of the radio-communication circuitry, (2) configuring the FHSS-based protocol for wireless communication between the wireless communication device and the radio-communication circuitry by providing time windows for the FHSS-based protocol which do not substantially conflict with the communication times of the radio-communication circuitry.

20. The apparatus of any of clauses 13 to 19, data-communication scheduling circuitry is further configured and arranged to determine if a connection to another wireless communication device is being established and establish coordinated communication schedules for the radio-communication circuitry to communicate with each of the other wireless communication device, the wireless communication device, and the ZigBee router.

A method for communicating between a combo-endpoint device, wireless router and a wireless communication device is described including monitoring communication patterns of wireless data communications between a wireless router and radio-communication circuitry of a combo-endpoint device, and storing data indicative of communication times of the wireless router based on the monitored communication patterns. The method further includes configuring a frequency-hopping (FH)-based protocol by defining connection periods according to time windows and selected frequencies for wireless communication of data between the wireless communication device and the radio-communication circuitry, and by establishing the time windows to not substantially conflict with the communication times of the wireless router.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, unit, controller, registry, memory and/or other circuit-type depictions (e.g., reference numerals 112/212 and 106/206 of FIGS. 1-2 depict a block/module as described herein). Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches shown in FIGS. 4 and 5 In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described at p. 19-28 is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to "a radio-communication circuitry" and "another radio-communication circuitry", etc., where the circuitry might be replaced with terms such as "circuit", "module" and others, the adjectives "a" and "another" are not used to connote any description of the structure or to provide any substantive meaning; rather, such adjectives are merely used for English-language antecedence to differentiate one such similarly-named structure from another similarly-named structure (e.g., "another circuitry configured to monitor . . . " is interpreted as "circuitry configured to monitor . . . ").

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, both the combo-endpoint device and the wireless communication device can include data-communication scheduling circuitry that perform a scheduling function. As another example, the combo-endpoint device may be in communication with a plurality of wireless communication devices, some of which allow for communication as a multiple of the wireless router and others that the scheduling circuitry uses the collision free condition to schedule communications. Such modifications do not depart from the true spirit and scope of various aspects of the disclosure, including aspects set forth in the claims.

The invention claimed is:

1. A method for communicating between a combo-endpoint device, a wireless router, and a wireless communication device, the method comprising:
    monitoring communication patterns of wireless data communications between a wireless router and radio-communication circuitry of a combo-endpoint device that includes an antenna, the endpoint device and the antenna to communicate across two different networks using two different protocols, one of the two different protocols including a spread spectrum (SS)-based protocol defined by the wireless router and another of the two different protocols including a frequency-hopping (FH)-based protocol;

storing data indicative of communication times of the wireless router based on the monitored communication patterns;

configuring the FH-based protocol by defining connection periods according to time windows and selected frequencies for wireless communication of data between the wireless communication device and the radio-communication circuitry, and by establishing the time windows to not substantially conflict with the communication times of the wireless router; and monitoring communication patterns between the wireless router and other wireless devices; and wherein configuring the FH-based protocol further includes determining the time windows and window offsets between the time windows as a multiple of the communication times of the wireless router and the radio-communication circuitry;

wherein determining the window offsets between the time windows uses a collision-free condition including:

Find $_{offb}$ not in ranges [(j*Dz−i*Db)−Lb, (j*Dz−i*Db)+Lz], i=[0,M], j=[0,N] If Dz=k*Db or k*Dz=Db, collision-free condition is Lz<offb<Dz−Lb, wherein Dz is a length of time for a cycle of a communication according to the SS-based protocol, Db is a length of time for a cycle of a communication according to the FH-based protocol, Lz is a length of a message according to the SS-based protocol, Lb is based on a length of a message according to the FH-based protocol, and k is a constant.

2. The method of claim 1, further including determining the window offsets between the time windows of the wireless communication of data as a period of time following or before the communication times of the wireless router.

3. The method of claim 1, wherein configuring the FH-based protocol further includes determining the time windows and window offsets between the time windows by:

identifying a pattern between the communication times of the wireless router and the time windows for the wireless communication of data between the wireless communication device and the radio-communication circuitry; and identifying window offsets between the time windows that results in the time windows not overlapping with the communication times of the wireless router based on the identified pattern.

4. The method of claim 3, wherein identifying the pattern includes identifying a common multiple period with at least two cycles of the wireless communication between the wireless communication device and the radio-communication circuitry and at least two cycles of communication times of the wireless router.

5. An apparatus comprising:

radio-communication circuitry configured and arranged to communicate wirelessly with a wireless router according to a spread spectrum (SS)-based protocol defined by the wireless router, and wirelessly with a wireless communication device via a frequency hopping (FH)-based protocol, which defines connection periods according to time windows and selected frequencies, for communication of data between the wireless communication device and the radio-communication circuitry; and data-communication scheduling circuitry configured and arranged to (1) monitor communication patterns of wireless data communications between the wireless router and the radio-communication circuitry to store data indicative of communication times of the wireless router, and (2) configure the FH-based protocol for communication between the wireless communication device and the radio-communication circuitry by providing time windows for the FH-based protocol which do not substantially conflict with the communication times of the wireless router;

wherein the data-communication scheduling circuitry is further configured and arranged to:

determine a pattern between the communication times of the wireless router and the time windows for the FH-based protocol; and identify an overlap between the communication times of the wireless router and the times windows within the pattern;

wherein the data-communication scheduling circuitry is further configured and arranged to identify window offsets between the time windows using a collision-free condition including: Find $_{offb}$ not in ranges [(j*Dz−i*Db)−Lb, (j*Dz−i*Db)+Lz], i=[0,M], j=[0,N], if Dz=k*Db or k*Dz=Db, collision-free condition is L<offb<Dz−Lb; and wherein Dz is a length of time for a cycle of a communication according to the SS-based protocol, Db is a length of time for a cycle of a communication according to the FH-based protocol, Lz is a length of a message according to the SS-based protocol, Lb is based on a length of a message according to the FH-based protocol, and k is a constant.

6. The apparatus of claim 5, wherein the data-communication scheduling circuitry is further configured and arranged to:

monitor communication patterns of wireless data communications between the wireless router and other wireless devices; and identify window offsets between the time windows that results in the time windows not overlapping with the communication times of the wireless router based on an identified pattern between the monitored communication patterns of communication times of the wireless router and the time windows for the FH-based protocol.

7. The apparatus of claim 5, wherein the data-communication scheduling circuitry is further configured and arranged to identify window offsets between the time windows using a collision-free condition based on the communication times of the wireless router, the time windows, and the determined pattern.

8. The apparatus of claim 5, wherein the data-communication scheduling circuitry is further configured and arranged to monitor wireless data communication between a plurality of wireless communication devices and the radio-communication circuitry and configured the FH-based protocol for communication between each of the plurality of wireless communication devices and the radio-communication circuitry by providing time windows for the FH-based protocol for each of the plurality of wireless communication devices and which do not substantially conflict with the communication times of the wireless router.

9. The apparatus of claim 5, wherein the data-communication scheduling circuitry is configured and arranged to identify window offsets as a period of time following the communication times of the wireless router that results in the time windows not overlapping with the communication times of the wireless router and based on an identified pattern between at least two communication times of the wireless router and at least two of the time windows for the FH-based protocol.

10. An apparatus comprising:
radio-communication circuitry configured and arranged to communicate wirelessly with a router according to a direct-sequence spread spectrum (DSS)-based network protocol defined by the router and according to the Institute of Electrical and Electronic Engineers (IEEE) 802.15.14 standard, and wirelessly with a wireless communication device via a frequency-hopping spread spectrum (FHSS)-based protocol which defines connection periods, in time windows, for communication of data between the wireless communication device and the radio-communication circuitry; and
data-communication scheduling circuitry configured and arranged to (1) monitor communication patterns of wireless data communications between the router and the radio-communication circuitry to store data indicative of communication times of the router, and (2) establish coordinated wireless communication schedules for the radio-communication circuitry to communicate with both the wireless communication device and the router by configuring the FHSS-based protocol for communication between the wireless communication device and the combo-endpoint device with selected time windows for FHSS-based data communications and by providing the selected time windows at intervals that do not substantially conflict with the communication times of the router;
wherein the data-communication scheduling circuitry is further configured and arranged to identify window offsets between the time windows using a collision-free condition including: Find $_{offb}$ not in ranges [(j*Dz–i*Db)–Lb, (j*Dz–i*Db)+Lz], i=[0,M], j=[0,N], if Dz=k*Db or k*Dz=Db, collision-free condition is Lz<offb<Dz–Lb; and
wherein Dz is a length of time for a cycle of a communication according to the DSS-based protocol, Db is a length of time for a cycle of a communication according to the FHSS-based protocol, Lz is a length of a message according to the DSS-based protocol, Lb is based on a length of a message according to the FHSS-based protocol, and k is a constant.

11. The apparatus of claim 10, wherein the data-communication scheduling circuitry is further configured and arranged to monitor communication patterns of wireless data communications between the router and its associated devices, the apparatus further including:
a power source configured and arranged to provide power to the radio-communication circuitry; and
a power control circuit configured and arranged to control connection of the power source to the radio-communication circuitry.

12. The apparatus of claim 10, wherein the data-communication scheduling circuitry is further configured and arranged to allocate frequencies and times for frequency hopping according to the monitored communication patterns of the wireless data communications between the router and the radio-communication circuitry by blocking channels of the monitored communication patterns in a channel hopping list for the FHSS-based protocol.

13. The apparatus of claim 12, wherein the radio-communication circuitry and the data-communication scheduling circuitry are further configured and arranged to wirelessly communicate the channel hopping list, which includes the allocated frequencies and times for frequency hopping, to the wireless communication device.

14. The apparatus of claim 10, wherein the data-communication scheduling circuitry is further configured and arranged to identify window offsets between the time windows using a collision-free condition based on a pattern between the communication times of the router and the time windows for the FHSS-based protocol in a common multiple period that results in the time windows not overlapping with the communication times of the router.

15. The apparatus of claim 10, wherein the radio-communication circuitry and the data-communication scheduling circuitry are further configured and arranged to communicate the time windows and window offsets for the FHSS-based protocol to the wireless communication device.

16. The apparatus of claim 10, further including the wireless communication device comprising:
a combo-communication integrated chip including:
another radio-communication circuitry configured and arranged to communicate wirelessly with the radio-communication circuitry via the FHSS-based protocol; and
a data-communication scheduling circuitry configured and arranged to (1) monitor communication patterns of the radio-communication circuitry and to store data indicative of communication times of the radio-communication circuitry, (2) configuring the FHSS-based protocol for wireless communication between the wireless communication device and the radio-communication circuitry by providing time windows for the FHSS-based protocol which do not substantially conflict with the communication times of the radio-communication circuitry.

17. The apparatus of claim 10, data-communication scheduling circuitry is further configured and arranged to
determine if a connection to another wireless communication device is being established and establish coordinated communication schedules for the radio-communication circuitry to communicate with each of the other wireless communication device, the wireless communication device, and the router.

* * * * *